Patented Mar. 1, 1949

2,462,978

UNITED STATES PATENT OFFICE 2,462,978

TITANIUM DIOXIDE MANUFACTURE

Ignace Joseph Krchma and James Eliot Booge, Wilmington, Del., assignors to E. I. du Pont de Nemours & Company, Wilmington, Del., a corporation of Delaware No Drawing. Application May 4, 1946, Serial No. 667,468

14 Claims. (Cl. 23—202)

This invention relates to the manufacture of titanium dioxide and more particularly to the production of pigmentary titanium dioxide in modified physical form.

Titanium dioxide is a well-known pigment which is recognized to excel all other known white pigmentary substances in covering power when employed in coating compositions, such as paints, enamels, lacquers, etc. It is also widely used as a delustering agent for artificial filaments used in the production of rayon or other artificial silks and in which use it is superior to any other known materials for reducing the objectionable sheen common to untreated rayon yarns.

Titanium dioxide is an inherently hard material, having a rating of 5.5 to 6.5 on the Mohs scale of hardness, on which talc is rated as 1 and diamond as 10. Hence, it is harder than iron, brass and aluminum, although softer than some of the harder alloy steels. Such hardness characteristics render titanium dioxide a potential abrasive substance, and, as a result, considerable difficulty is encountered in certain of its fields of application. For example, white paints containing $TiO_2$ sometimes discolor upon passage through a paint grinding mill, due to the fact that the metal rolls become abraded and fine metal particles become mixed with the paint. A more serious problem occurs in rayon manufacture where thread guides often become unduly worn and require frequent replacement when titanium dioxide is employed therein as a delusterant.

The quality of abrasiveness depends both on the hardness and on the size and shape of the abrasive substance. Crystalline particles having sharp or jagged points and edges are very much more abrasive than spherical particles having rounded edges. Hence, the abrasive character of any given material will be at a substantial minimum when it exists in the form of spheres.

It is among the objects of this invention to overcome the above and other disadvantages which characterize prior forms of titanium oxide and to provide for the production of titanium dioxide particles in spherical form and possessing greatly reduced abrasive properties. A further object is to provide a novel method for obtaining such spherical as distinguished from crystalline $TiO_2$ particles, which latter have sharp edges and corners and are highly abrasive. A particular object is to provide a novel method for manufacturing a non-abrasive type of $TiO_2$ pigment through the gas phase oxidation of a titanium tetrahalide, such as titanium tetrachloride. Other objects and advantages of the invention will be evident from the ensuing description thereof.

These and other objects are accomplished in this invention which comprises obtaining a non-abrasive form of $TiO_2$ product by oxidizing a gaseous titanium halide, particularly titanium tetrachloride, at an elevated temperature of at least 800° C. and in the presence of a minor amount of a volatile compound of an acid-forming, non-metal element from the group consisting of sulphur and phosphorus.

In a more specific and preferred embodiment the invention comprises producing a spherical form of anatase titanium oxide pigment by conducting the vapor phase oxidation of titanium tetrachloride, at a temperature ranging from about 900 to 1200° C., in the presence of a small amount of a chloride of an element from the group consisting of sulphur and phosphorus.

In practically adapting the invention, a titanium tetrahalide, preferably titanium tetrachloride, is vaporized in a conventional manner, the resulting vapors being then reacted in a suitable reaction zone or chamber with an oxidizing gas, such as air, oxygen, etc., in the presence of a minor amount of, vaporized sulfur or phosphorus halide, especially a chloride thereof, to precipitate the desired spherical titanium oxide product. An amount of sulfur or phosphorus halide ranging from about 1 to 20 per cent by weight of the non-metal chloride, based on the weight of titanium tetrachloride can be generally employed in the process. Preferably, however, an amount ranging from about 2 to 10 per cent by weight is resorted to. In general, the greater the proportion of added sulphur or phosphorus chloride, the higher will be the fraction of spherical $TiO_2$ particles obtained, up to the limiting amounts specified. The use of smaller amounts, however, is more preferable especially for reasons of economy. The reaction chamber used is maintained at a temperature ranging from about 800° C. to 1350° C., and preferably from between 900° C. and 1200° C. The rate of flow of the reacting gases is so regulated and controlled that the reactants and products are permitted to remain in the heated chamber only for a relatively short period ranging from between 0.1 and 5 seconds. During the treatment and reaction the titanium and sulphur or phosphorus halides become converted to their respective oxides with a halogen being formed as a by-product. The reaction products are quickly withdrawn from the reaction chamber and are subjected to immediate, rapid cooling to prevent further, undesired growth of the titanium dioxide particles. The titanium oxide can be separated and recovered from the gas stream by any suitable means, such as by resort to a cyclone separator, settling chambers, glass cloth filters, or the like.

To a clearer understanding of the invention, the following specific examples are given, each being illustrative but not in limitation of the invention:

Example I

A mixture consisting of 2 parts by weight of sulphur monochloride and 98 parts by weight of titanium tetrachloride was vaporized, preheated to 1000° C. and then introduced through a central orifice of a concentric type nozzle to a reaction chamber maintained at 1000° C. Dry oxygen, similarly preheated to 1000° C., was concurrently admitted through the outer annulus of said concentric nozzle into said chamber at a rate such that 38 parts by weight of oxygen were admitted for each 100 parts of the chloride mixture. The mixed reaction gases were allowed to remain in the furnace for an average of three seconds, after which they were rapidly cooled and the resulting pigment titanium oxide was recovered from the reaction products by passage through a glass cloth filter. Said pigment was non-abrasive anatase of good quality and, when photographed through an electron microscope, consisted predominantly of spherical particles.

Another $TiO_2$ sample was prepared employing the same reactants, apparatus, flow rates and temperatures as those just mentioned, except that sulphur monochloride use was excluded. In this instance, an anatase pigment was also obtained but it was hard and abrasive in type, and electron micrographs showed it to consist of only well-formed crystals, with a complete absence of any spherical particles.

Example II

A mixture consisting of 10 parts by weight of phosphorus trichloride and 90 parts by weight of titanium tetrachloride was vaporized, preheated to 1000° C. and admitted through the central orifice of a concentric type nozzle to a reaction chamber maintained at 1025° C. 100 parts by weight of dry air, also preheated to 1000° C., were concurrently introduced through the nozzle annulus. The mixed reacting gases were retained in the furnace for an average of 2.1 seconds and were then cooled rapidly and the resulting non-abrasive type of titanium dioxide product was separated from the exhaust gases by passing the mixture through a glass cloth filter. When examined by means of an electron microscope, this pigment was found to consist mostly of uniform, spherical particles.

Duplicating this example under identical conditions, except that phosphorus trichloride presence was excluded from the reaction, resulted in a hard, abrasive type of product having no spherical particles when examined under the electron microscope.

While described as applied to certain preferred embodiments, the invention is not limited thereto, since due variance may be had without departing from its underlying principles and scope. Thus, while sulfur monochloride ($S_2Cl_2$) and phosphorus trichloride ($PCl_3$) are preferred for use, other volatile compounds of sulfur or phosphorus, or mixtures thereof, especially the chlorides and oxychlorides thereof, a can be used in the amounts above-mentioned, and may be admitted to the reaction zone either alone or in conjunction with either or both gaseous reactants. Thus, the volatile oxides and salts, especially halides, of said elements can be employed, included among examples of which are sulphuryl chloride, $SO_2Cl_2$, thionyl chloride, $SOCl_2$, sulphur dichloride, $SCl_2$, sulfur dioxide, $SO_2$, sulfur trioxide, $SO_3$, sulfur iodide, $S_2I_2$, sulfur bromide, $S_2Br_2$, phosphorus dichloride, $PCl_2$, phosphorous pentachloride, $PCl_5$, phosphorus oxides, such as the trioxide, $P_2O_3$, or pentoxide, $P_2O_5$, phosphorus oxychloride, $POCl_3$; phosphorus sulfides, phosphorus bromides, phosphorus diiodide ($P_2I_4$), etc.

For greatest effectiveness the vapors of titanium tetrachloride and of the non-metal halide should be mixed prior to their introduction into the furnace. Admixture with the oxygen-containing gas, on the other hand, should not take place until the gases enter the reaction chamber, in order to prevent premature oxidation taking place. In most cases, both the halide gas mixture and the oxygen-containing gas are preheated to above about 400° C., and preferably to between 600° C. and 1000° C., prior to admission to the furnace, in order that reaction will take place rapidly upon mixing. As in other gas phase oxidation processes for titanium tetrachloride, it is desirable to afford rapid and intimate mixture of the gases in the reaction chamber in order that the reaction will go essentially to completion and that pigment particles of fairly uniform size will be formed.

To obtain titanium dioxide of suitable particle size characteristics and in high yield from the gas phase oxidation of titanium tetrachloride, it is necessary to provide adequate nucleation by the provision of seeding particles of titanium oxide or oxychloride, either added as such or formed in situ as by the addition of small amounts of water vapor. When minor amounts of the contemplated sulphur or phosphorus compounds of this invention are present, they induce a desirable catalytic effect upon the reaction and function in some way as nucleating agents. This effect is probably connected with the ease with which the halides of sulphur and of phosphorus are oxidized, and with the heat evolved by their oxidation, leading to the probable formation of activated molecular fragments capable of initiating the titanium tetrachloride oxidation. While in view of this fact the addition of water vapor or other nucleating agents is usually unnecessary, it may in some cases be desirable to effect further acceleration and control of the reaction by the use of such additional nucleating agents and their employment in conjunction with the sulfur and phosphorus compounds herein mentioned is accordingly contemplated. A particularly useful type oxidation method in conjunction with which the present invention may be practiced comprises that disclosed in the copending application of Holger Schaumann, Serial No. 653,428, filed March 9, 1946.

It is essential that the oxidation step be conducted under such conditions that the titanium dioxide yield is predominantly anatase rather than rutile, since it has been found that the sphericity of the $TiO_2$ particles produced under the invention is invariably destroyed upon converting such particles to rutile. In the absence of rutile seed nuclei (added either as such or formed in situ), the product obtained will be predominantly anatase so long as the reaction zone temperature does not exceed 1350° C. and the mixed gases and reaction products are not permitted to remain therein at this temperature for more than 5 seconds. In the preferred operation, however, a temperature of 900° C. to 1200° C. is resorted to, along with a shorter retention time, i. e., between 0.1 and 2 seconds, to insure production of a product more uniform and desirable in particle size and other essential properties. Generally, the chances of converting the $TiO_2$ product to rutile will be found to increase as the temperature and retention times increase. If, on the other hand, temperature and retention time are too low, incomplete reaction will result rendering it necessary to strike a balance between these requirements. However, by insuring rapid and complete mixing of the reactants after their introduction into the reaction chamber, an essentially complete reaction is secured with production of an anatase pigment. If water vapor is added to accelerate the reaction, in accordance with the aforesaid Schaumann application Serial No. 653,428, it is desirable that the gases be subjected to lower preheats, i. e., below about 350° C., in order to avoid any rutile formation.

While particularly described in connection with the titanium tetrachloride oxidation, the invention is also applicable to the vapor phase oxidation of other titanium halides, including those of iodine and bromine.

The exact manner in which the sulfur and phosphorus compounds exert their desired effect upon the ultimate $TiO_2$ particles by reason of the presence of such compounds during the vapor phase oxidation of a titanium halide is not presently clearly understood, but it appears that the added sulphur or phosphorus compounds promote incipient fusion of the surface layer of the $TiO_2$ pigment particle with surface tension forces producing a rounded surface. The particle exhibits the X-ray pattern of anatase and this establishes crystallinity. That is, the product is crystalline but the surface of the particles is rounded and does not possess the sharp angles ordinarily found among crystals or the sharp or jagged edges of the prior art particles, thereby rendering them non-abrasive in character. This is very important in the grinding of paints as the abrasive pigment will tend to wear paint milling equipment.

We claim as our invention:

1. A process for producing a non-abrasive form of titanium oxide from the vapor phase oxidation of a gaseous titanium halide, comprising effecting said oxidation in the presence of a volatile compound of a non-metal element selected from the group consisting of sulfur and phosphorus.

2. A process for producing a non-abrasive form of $TiO_2$ from the vapor phase oxidation of a gaseous titanium halide, comprising effecting said oxidation at a temperature of at least 800° C. and in the presence of a minor amount of a volatile halide of an element selected from the group consisting of sulfur and phosphorus.

3. A process for producing a non-abrasive form of $TiO_2$ from the vapor phase oxidation of gaseous titanium tetrachloride, comprising effecting said oxidation in the presence of a minor amount of a volatile chloride of an element selected from the group consisting of sulfur and phosphorus.

4. A process for producing a non-abrasive, substantially spherical form of anatase $TiO_2$ through the vapor phase oxidation of titanium tetrachloride, comprising effecting said oxidation in the presence of a small amount of a volatile chloride of an acid-forming element selected from the group consisting of sulfur and phosphorus.

5. A process for producing a non-abrasive, substantially spherical form of anatase $TiO_2$ through the vapor phase oxidation of titanium tetrachloride, comprising effecting said oxidation in the presence of from 1% to 20%, by weight, based on said tetrachloride, of a volatile chloride of an acid-forming element selected from the group consisting of sulfur and phosphorus.

6. A process for producing a non-abrasive, substantially spherical form of anatase $TiO_2$ through the vapor phase oxidation of titanium tetrachloride, comprising effecting said oxidation in the presence of from 2% to 10%, by weight, based on said tetrachloride, of a chloride of an acid-forming element selected from the group consisting of sulfur and phosphorus.

7. A process for producing a non-abrasive, substantially spherical form of anatase $TiO_2$ through the vapor phase oxidation of titanium tetrachloride, at temperatures ranging from 900–1200° C., comprising effecting said oxidation in the presence of from 2% to 10%, by weight, based on said tetrachloride, of sulfur monochloride.

8. A process for producing a non-abrasive, substantially spherical form of anatase $TiO_2$ through the vapor phase oxidation of titanium tetrachloride, at temperatures ranging from 900–1200° C., comprising effecting said oxidation in the presence of from 2% to 10%, by weight, based on said tetrachloride, of phosphorus trichloride.

9. A method for producing a non-abrasive, spherical form of pigmentary anatase titanium dioxide which comprises reacting titanium tetrachloride and an oxidizing gas in the vapor phase and at temperatures ranging from 800–1350° C. in the presence of from 1–20% by weight, based on the $TiCl_4$, of a volatile chloride of an element selected from the group consisting of sulfur and phosphorus.

10. A method for producing a non-abrasive, spherical form of pigmentary anatase titanium dioxide which comprises reacting titanium tetrachloride and an oxidizing gas in the vapor phase and at temperatures ranging from 900–1200° C. in the presence of from 2–10% by weight, based on the $TiCl_4$, of a volatile chloride of an element selected from the group consisting of sulfur and phosphorus.

11. A method for producing a non-abrasive, spherical type of pigmentary $TiO_2$ in the anatase crystalline form, which comprises reacting titanium tetrachloride in the vapor phase with an oxidizing gas, effecting said reaction over a time period ranging from between 0.1 and 5 seconds, in the presence of from 1–20% by weight, based on the $TiCl_4$, of a volatile chloride of an element selected from the group consisting of sulfur and phosphorus and within a reaction zone maintained at a temperature ranging from 800–1350° C.

12. A method for producing a non-abrasive, spherical type of pigmentary $TiO_2$ in the anatase crystalline form, which comprises reacting titanium tetrachloride in the vapor phase with an oxidizing gas, effecting said reaction over a time period ranging from between 0.1 and 2 seconds, in the presence of from 1–20% by weight, based on the $TiCl_4$, of a volatile chloride of an element selected from the group consisting of sulfur and phosphorus and within a reaction zone maintained at a temperature ranging from 900–1200° C.

13. A method for producing a non-abrasive, spherical type of pigmentary $TiO_2$ exhibiting the anatase crystalline form which comprises passing preheated titanium tetrachloride admixed with from about 1-20% by weight, based on the weight of the TiCl₄, of a volatile chloride of an element selected from the group consisting of sulfur and phosphorus into a reaction zone maintained at a temperature ranging from 800-1350° C. and reacting said titanium tetrachloride with an oxidizing gas within said zone over a time period ranging from between 0.1 and 5 seconds.

14. A method for producing a non-abrasive, spherical type of pigmentary TiO₂ exhibiting the anatase crystalline form which comprises passing titanium tetrachloride preheated to a temperature between 600-1000° C. admixed with from about 2-10% by weight, based on the weight of the TiCl₄, of a volatile chloride of an element selected from the group consisting of sulfur and phosphorus into a reaction zone maintained at a temperature ranging from 900-1200° C. and reacting said titanium tetrachloride with an oxidizing gas within said zone over a time period ranging from between 0.1 and 2 seconds.

IGNACE JOSEPH KRCHMA.
JAMES ELIOT BOOGE.

No references cited.